July 18, 1961 — A. H. WEDDENDORF, JR — 2,992,657
CONTROL DEVICE FOR FLOWABLE MATERIALS
Filed June 2, 1958
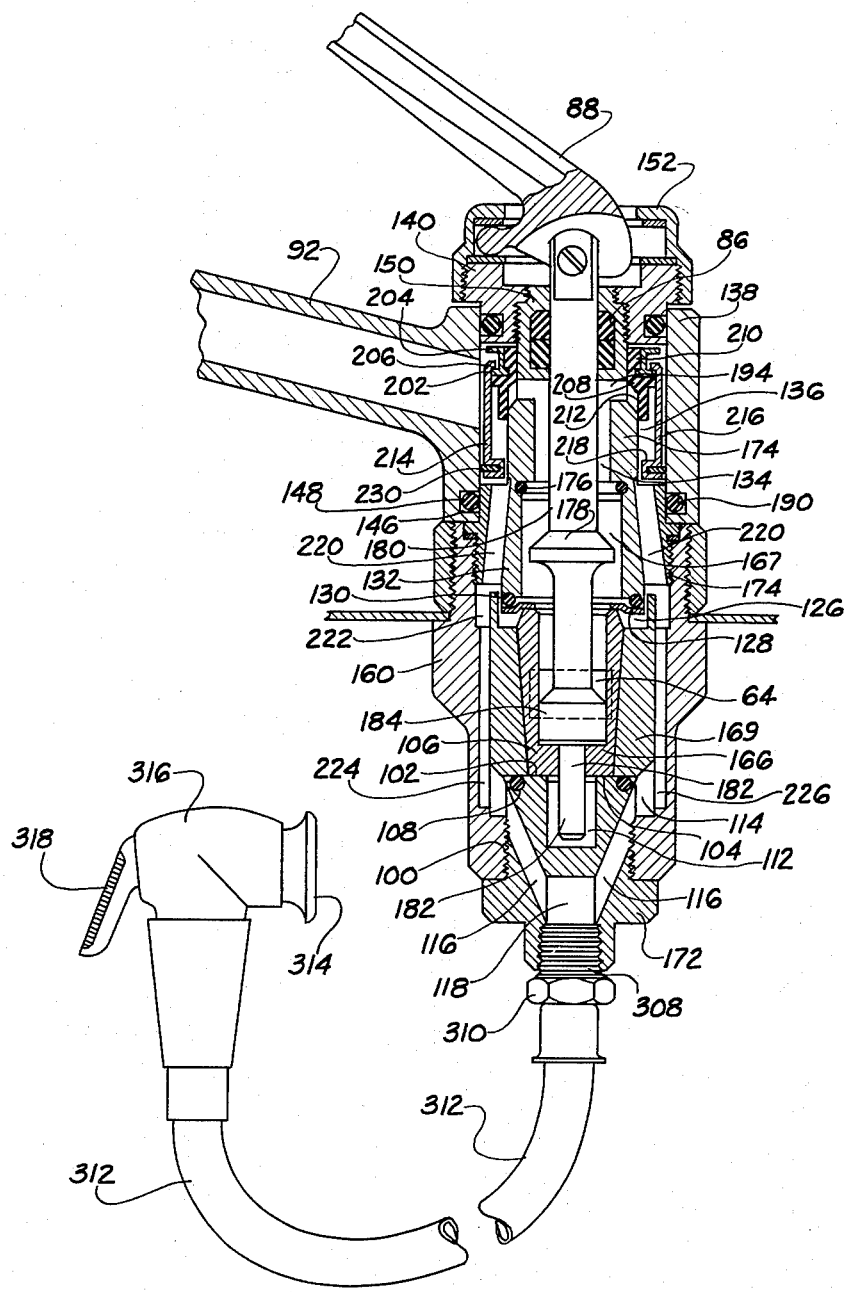
INVENTOR.
ALBERT H. WEDDENDORF JR
BY
ATTORNEYS United States Patent Office 2,992,657
Patented July 18, 1961

2,992,657
CONTROL DEVICE FOR FLOWABLE MATERIALS
Albert H. Weddendorf, Jr., 5930 Farlook Drive,
Cincinnati 39, Ohio
Filed June 2, 1958, Ser. No. 739,364
4 Claims. (Cl. 137—625.41)

This invention relates to mixing devices for flowable materials and is particularly concerned with a mixing valve. More particularly still this invention is concerned with a mixing device such as a faucet which utilizes a single lever for controlling the respective volumes of hot and cold water and also for opening and closing the faucet. Valves of this nature heretofore have been relatively complex and expensive in order to attain the desired objective of maintaining the adjustment of the relative volumes of the hot and cold water while permitting the valve to be opened and closed.

The present invention is a continuation in part of my co-pending application Serial No. 474,198, filed December 9, 1954, now abandoned.

With this in mind, a primary object of the present invention is the provision of an improved valve structure characterized in utilizing only a single lever for controlling the relative quantity of the flow of both hot and cold water and also the total volume flowing through the valve and to the discharge spout.

Another object of the present invention is the provision of a relatively simple valve of the nature referred to which can be manufactured at a reasonable cost and which will be relatively trouble-free.

Further objects and advantages will be apparent from the following description, reference being had to the accompanying drawings wherein a preferred embodiment of the invention is illustrated.

The valve body of the present invention includes a removable coupling or plug which is provided with a land; a tapered valve member in the form of a cup rests on this land. A further object of the present invention is to yieldingly urge the cup-shaped valve member against the land.

In the drawing:

The figure is a vertical sectional view through a valve showing the invention.

Referring to the embodiment shown in the drawing, the valve body 160 is bored to receive a valve seat member 169 which is pressed into position. This bore in member 169 is tapered outwardly, upwardly to receive the cup shaped valve member 166 which is also tapered upwardly, outwardly and complements the taper in seat member 169, both of which are circular in cross section.

The bottom of the body 160 is closed by a plug or coupling 172, threaded in position as shown at 100. This plug is provided with a circularly shaped, upwardly facing land 102 upon which rests the bottom surface 104 of the bottom wall 106 of member 160. The top of plug 172 is also provided with a groove 108 for receiving a sealing O ring 110 which abuts the bottom of member 169. Plug or coupling 172 is centrally recessed as at 112 for providing for turning of the rectangularly shaped spline 182.

Coupling or plug 172 is provided with a groove 114 at the upper peripheral edge thereof and with angularly disposed passages 116 extending from the groove to a central outlet 116. The bottom of the coupling is threaded for receiving a flexible tube 116 which is a part of a spray apparatus. The spray apparatus includes a spray nozzle 118 which is manually controlled by a valve 120.

The top of member 169 is internally undercut as at 126 and the top of valve member 166 extends above the bottom of this undercut where it is engaged by a bearing ring 128 and forced downwardly resiliently by an O ring of rubber 130 or other resilient material. Thus the valve member is constantly yieldingly urged downwardly into the land 102 of coupling 172. Should there be any wear of the side walls of the valve member 166, there will be a substantially like wear of the land or bottom wall surface 104 of bottom 106 or vice versa. Thus a complementary fit is always maintained between the valve members 166 and 169.

The ring 130 is held in position by the skirt 132 of a valve body or fitting 174, it being engaged by the bottom of the skirt. Fitting 174 is provided with external thread 134 by which it is threaded into the upper part of body 160. Fitting 174 is provided with a groove for receiving an O ring type valve seat 176 which is arranged to be engaged by the valve surface 178 on valve 180 when the valve 180 is raised to its uppermost position and functions as a shut-off valve for preventing the flow of water from chamber 167 to the passage 134 which surrounds the valve 180 above the surface 178 thereof. Passage 134 communicates with the outlet passages 194, which latter in turn is connected with an annular passage 136 formed by the upper part of fitting 174 and the head 138 of faucet 92.

Valve 180 is provided with a rectangularly shaped spline 182 by which it is connected with valve member 166. Also valve 182 includes a piston or cylindrical type valve section 184 which can be raised and lowered, with the valve 180, for governing the volume of water flowing through inlet passages 62 and/or 64.

A fitting 140 is threaded onto the top of fitting 174. Fitting 140 is provided with a circumferential groove 142 for receiving an O ring 144, which latter forms the seal between the upper part of faucet head 138 and fitting 174, and, fitting 174 is provided with a groove 146 for receiving an O ring 148, which latter forms the seal between the lower part of the faucet head and the fitting 174.

The upper part of valve 180 extends through a packing 86 in fitting 174 and this packing is held in place by a gland 152 threaded into fitting 140. A cap 152 is threaded onto the top of fitting 140; it is open at the top for receiving the head 154 of a handle 156. This handle is connected to the top of valve 180 by a screw 158. Handle 156 is provided with an extension 196, having an upper shoulder 198 and a lower shoulder 200 arranged, respectively, to engage the underside of cap 152 and the top surface of fitting 140, to thereby form pivots for the handle by which the valve 180 is lowered and raised.

A diverter valve 202 is provided for diverting water from the faucet 92 to the spray nozzle. Valve 202 includes a ring 204, which is U-shaped in longitudinal cross section, to provide an upwardly facing valve seat 206; the inner periphery of ring 204 carries a rubber ring 208, the upper part 210 of which closely embraces the upper portion of fitting 174 above the radial passages 194, and includes a skirt 212 which resiliently engages the periphery of fitting 174 below passage 194.

Valve 202 also includes a metallic circular sleeve 214 which is provided with an inwardly turned edge at the top thereof to provide a downwardly facing valve 216 which latter cooperates with the upwardly facing seat 206 of ring 204 to control the flow of water from chamber 136 to the faucet 92. The lower end of sleeve 214 is turned inwardly to form a pressure ring 218, the inner periphery of which is spaced from the outer periphery of fitting 174 for the ready passage of water to the space therebelow, whence it flows through passages 220 in fitting 174 to the circular chamber 222 therebelow, thence by two drilled passages 224 and 226 in body 160 to the groove 114, thence by passage 116, outlet 118, and tube 120 to spray nozzle 122 when valve 124 is open. At this time, pressure in the rubber skirt 212 causes the same to expand to permit the flow of water from outlet passage 194 to circular chamber 136, and, water pressure on pressure ring 218 forces sleeve 214 downwardly whereby valve 216 is closed in seat 206 to prevent the flow of water to the faucet 92.

When, however, the spray nozzle valve 124 is closed, water pressure will force sleeve 214 upwardly thereby causing valve 216 to move away from its seat 206 so that water can freely flow from chamber 136 to the faucet 92.

A rubber ring 230 is carried by the sleeve 214 for the dual purpose of preventing water from flowing from circular chamber 136 to the faucet when the spray nozzle is open and for yieldingly retaining sleeve 214 in its uppermost position i.e. sleeve 214 is normally held in its upper position whereby valve 206—216 is open, and is moved downwardly only when the spray nozzle valve is opened. The inner periphery of spray nozzle head 138, in cooperation with the rubber ring 230, provides a guide for sleeve 214.

The skirt 212 on the rubber ring 208 embraces the circular periphery of fitting 174 directly below the outlet passages 194 when the valve 178 is closed on its seat 176. It therefore functions as a valve to prevent syphonic action of partly draining passage 134 in the event the spray nozzle is actuated while the valve 178 is closed.

The shut-off valve 178 is so arranged that pressure, within the mixing chamber 167, is utilized to urge said valve to closed position; thus should there be any leakage at an inlet valve, the pressure of the water will seal the shut-off onto its seat.

The valve illustrated and described has been referred to as a mixing faucet, particularly for use in kitchen sinks and the like, for controlling hot and cold water to obtain the proper temperature of the mixture thereof and the proper rate of flow.

However, it is to be understood that the present invention broadly comprehends the use of the disclosed principles in connection with any mixing operation involving flowable materials that are to be mixed in varying degrees.

Such operations often occur in industries, particularly in chemical and food industries, and it will, accordingly, be understood that the reference to mixing of hot and cold water is merely for the purpose of illustration.

It has been explained previously that the valve arrangement, according to the present invention, is useful broadly as a valve or mixing device, and it will accordingly be understood that the term "faucet" as used in the appended claims is intended to include such usages of the device. For example, while the mixing device has been shown and described specifically as a mixing-type faucet for use in kitchen sinks, one of the preferred usages of this device would be in connection with a shower control, with one lever being employed to regulate the temperature and the other lever being employed to control the volume of water. The present valve is more particularly adapted for this particular purpose since the valve member that controls the volume is threaded into the valve body so that it will stay in whatever position it is placed.

While the form of embodiment herein shown and described constitutes a preferred form, it is to be understood that other forms may be adopted falling within the scope of the claims that follow.

I claim:

1. A mixing valve comprising in combination, means forming a valve body, said body forming a chamber, and having a plurality of inlet openings leading to the chamber, said chamber being circular in cross section and having a tapered inner wall, said inlet openings forming valve ports in said wall; a rotatable hollow valve element within the chamber, said valve element having an open end and being circular in cross section and having its outer circular wall tapered to complement the taper of said chamber, said valve element having ports adapted to register with the ports in the valve body, said east mentioned ports being in intercommunicative relationship with the hollow of the valve element; a second valve body forming a chamber having an open end confronting the open end of the hollow valve element whereby said chamber of the second valve element is in open communication with the interior of the valve element and the adjacent ends of said chamber of the second mentioned valve body and the valve element lie in parallel planes; a bearing ring spanning said adjacent ends and bearing against one of said ends; and resilient means interposed between the other of said ends and the ring and cooperating with the ring to provide a seal between said valve element and the second mentioned valve body and yieldingly urging said valve element toward the tapered inner wall of the first mentioned chamber.

2. A mixing valve as defined in claim 1, characterized in that the resilient sealing means comprises a rubber O-ring.

3. A mixing valve comprising in combination, means forming a valve body, said body forming a chamber, and having a plurality of inlet openings leading to the chamber, said chamber having a wall circular in cross section, said inlet openings forming valve ports in said wall; a rotatable hollow valve element within the chamber and closely embraced by the circular wall of the chamber, said valve element having an open end and being circular in cross section, said valve element having ports adapted to regiser with the ports in the valve body; a second valve body forming a chamber having an open end confronting the open end of the hollow valve element whereby said chamber of the second valve element is in open communication with the interior of the valve element and the adjacent ends of said chamber of said second valve body and the valve element lie in parallel planes; a bearing ring spanning said adjacent ends and bearing against one of said ends; and resilient means interposed between the other of said ends and the ring and cooperating with the ring to provide a seal between said valve element and the second mentioned valve body.

4. A mixing valve as defined in claim 3, characterized in that the resilient sealing means comprises a rubber O-ring.

References Cited in the file of this patent

UNITED STATES PATENTS

| | | |
|---|---|---|
| 742,327 | Huye | Oct. 27, 1903 |
| 1,865,517 | Henderson | July 5, 1932 |
| 2,800,923 | Russell | July 30, 1957 |
| 2,818,878 | Russell | Jan. 7, 1958 |
| 2,829,645 | Matterson | Apr. 8, 1958 |
| 2,839,081 | Wolf | June 17, 1958 |
| 2,845,949 | Parker | Aug. 5, 1958 |
| 2,847,031 | Brown | Aug. 12, 1958 |